(12) United States Patent
Gunther (10) Patent No.: US 8,710,153 B2
(45) Date of Patent: Apr. 29, 2014

(54) SELF-ASSEMBLING SURFACE COATING

(71) Applicant: Empire Technology Development LLC, Wilmington, DE (US)

(72) Inventor: Janelle Gunther, Pleasanton, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/685,181

(22) Filed: Nov. 26, 2012

(65) Prior Publication Data
US 2014/0066554 A1 Mar. 6, 2014

Related U.S. Application Data

(62) Division of application No. 12/478,661, filed on Jun. 4, 2009, now Pat. No. 8,343,585.

(51) Int. Cl.
| | | |
|---|---|---|
| C09D 153/02 | (2006.01) | |
| B01D 71/82 | (2006.01) | |
| C08L 53/02 | (2006.01) | |
| C08F 297/02 | (2006.01) | |
| C08L 101/00 | (2006.01) | |
| C09D 201/00 | (2006.01) | |

(52) U.S. Cl.
CPC .......... *C09D 153/02* (2013.01); *C09D 153/025* (2013.01); *C08F 297/02* (2013.01); *C08L 101/005* (2013.01); *B01D 71/82* (2013.01); *C09D 201/005* (2013.01)
USPC .......................................... 525/314; 525/232

(58) Field of Classification Search
CPC ...... C08F 297/046; C08F 8/14; C08F 297/04; C08F 297/02; C08L 53/02; C08L 9/04; C08L 101/005; C09D 153/025; C09D 153/02; C09D 201/005; B01D 71/82
USPC .................................................. 525/232, 314
See application file for complete search history.

(56) References Cited

U.S. PATENT DOCUMENTS

| | | | |
|---|---|---|---|
| 5,948,470 | A | 9/1999 | Harrison et al. |
| 7,189,435 | B2 | 3/2007 | Tuominen et al. |
| 2006/0069172 | A1 | 3/2006 | Gunther |
| 2010/0310885 | A1 | 12/2010 | Gunther |

FOREIGN PATENT DOCUMENTS

WO    WO 0121678 A1 *  3/2001

OTHER PUBLICATIONS

MRS Materials Research Society; "Symposium U: Organics with Supramolecular Structure and Function"; MRS Website; http://www.mrs.org/s_IIU"s/cloc.asp?C I D= 14602&D ID=88951; 1998; pp. 1-10.

Janelle Gunther & Samuel I. Stupp; "Surface Patterns of Supramolecular Materials"; Research Article; Sep. 13, 2001; Langmuir 2001, 17, pp. 6530-6539.

(Continued)

*Primary Examiner* — Mark Kaucher
(74) *Attorney, Agent, or Firm* — Jensen & Puntigam, PS (57) ABSTRACT

Mechanisms for coating surfaces of materials, the resulting coated materials, and solutions for use in material-coating processes are described. Triblock molecule components may be selected for desired properties. When applied in solution to a material, the molecules self-assemble into similarly oriented micro- or nanostructures coating the surface of the material. Various molecule properties can be tailored to produce a range of desirable surface coating properties. The surface coating may optionally be self cleaning if selected to be appropriately hydrophobic, allowing water and particulates to roll off of the surface with minimal friction.

16 Claims, 8 Drawing Sheets

SELF-ASSEMBLED TRIBLOCK NANOSTRUCTURE 300
HYDROPHOBIC END 350
RANDOM COIL PORTION 330
FLEXIBLE SPACER PORTION 320
END GROUP PORTION 310
HYDROPHILIC END 340

(56) References Cited

OTHER PUBLICATIONS

Eugene Zubarev, et al., "Conversion of Supramolecular Clusters to Macromolecular Objects Materials," Science, Jan. 1999, vol. 283, pp. 523-526.

Xia, Y and Whitesides, "Soft Lithography," Angew Chem. Int. Ed 1998, vol. 37, pp. 550-575.

Eugene Zubarev, et al., " the Molecular Basis of Self- Assembly of Dendron Rod-Coils Into One-Dimensional Nanostructures," Chem. European Journal, 2006, vol. 12, pp. 7313-7327.

Robert J. Young and Peter A. Lovell, "Introduction to Polymers", book, Third Edition, 2011, 34 pgs, CRC Press, US.

Merriam-Webster Dictionary, "bulk", website: http//www.merriam-webster.com, p. 1-3.

Stendahl et al, Advanced Functional Materials, 15(3), pp. 487-493, 2005. Reference available in parent application file history.

Stupp, S.I., et al., "Supramolecular Materials: Self-Organized Nanostructures," Science, vol. 276, No. 5311, pp. 384-389 (1997) (Cited by Office in parent application).

* cited by examiner

SURFACE COATING PATTERNS
610

611

612

613

LESS CONCENTRATED ⎯⎯⎯⎯⎯⎯⎯⎯⎯⎯⎯⎯⎯⎯⎯⎯ MORE CONCENTRATED →
CONCENTRATION OF COATING SOLUTION

SELF-ASSEMBLING SURFACE COATING

CROSS-REFERENCE TO RELATED APPLICATIONS

Priority is claimed to U.S. patent application Ser. No. 12/478,661, entitled "SELF-ASSEMBLING SURFACE COATING", filed on Jun. 4, 2009.

BACKGROUND

For more than 2000 years, people have observed that the leaves of the lotus flower are extremely water-repellant (superhydrophobic) and that, although the lotus grows in muddy water, the leaves never appear to be dirty. The advent of the scanning electron microscope in the 1970s enabled scientists to determine the properties of the lotus leaf that enable it to be self-cleaning: in addition to its waxy surface, the leaf contains microscopic bumps and hair-like structures that cause water to bead on the surface of the leaf rather than spreading out; the water droplets then roll down the leaf with little friction, removing dirt and bacteria along the way.

The discovery of the mechanism behind the "lotus effect" has led to interest in transferring this effect to artificial surfaces through a variety of patterning methods, resulting in surfaces that may clean themselves, for example, through a simple rainfall. Examples of the diverse markets that may benefit from development of cost-effective self-cleaning surfaces include automotive paint coatings, mirrors, and windows; and, alternative energy industries, such as solar cell arrays and wind turbine blades that benefit from being self-cleaning and/or easy to clean and maintain. However, present methods in this area are lacking in that they are time-consuming, expensive, ineffective, require highly specific, specialized, and expensive equipment, or require specialized laboratory environments to effectively implement.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure generally describes systems and methods for coating surfaces of materials, the resulting coated materials, and solutions for use in materials coating processes. In general, triblock molecules may be selected in accordance with this disclosure and manufactured to have desirable coating and self-assembly properties. These molecules may be disposed in a solution that is applied to a material substrate. The solution may be allowed to evaporate off of the substrate, and as the solution evaporates, appropriately selected triblock molecules in a desired concentration may self-assemble into a useful surface coating that may optionally be "self cleaning" or impart other desired properties as described herein.

Appropriately selected triblock molecules may self-assemble nearly instantaneously into organic nanostructures with varying degrees of hydrophobicity. These molecules may be blended with a bulk polymer to develop surface texture on a micro- or nanoscale level. The rapid and automatic nature of self-assembly may be advantageous in efficiently creating micro- or nanopatterning over large surface areas. In addition, the self-assembly may take place on surfaces of arbitrary shapes with curved or angular features that would be difficult to pattern using conventional lithographic or focused ion beam techniques.

The hydrophobicity of a solid surface is determined by the contact angle—the angle at which a liquid or vapor meets the surface. The higher the contact angle, the more hydrophobic the surface will be. Surfaces with a contact angle of less than 90° are considered hydrophilic, while surfaces with a contact angle of more than 90° are considered hydrophobic. A superhydrophobic surface may have a contact angle of up to 160°, resulting in only 2-3% of a drop's surface coming into contact with the solid surface. Plants with a double-structured surface such as the lotus may reach a contact angle of 170°, with only 0.6% of the drop's surface coming into contact with the leaf surface. On such hydrophobic surfaces, water droplets simply rest on the surface without actually wetting the surface to any significant extent, and then roll off of the surface with minimal friction.

"Self-assembly" describes a process in which a disordered system of pre-existing components forms an organized structure or pattern as a result of interactions among the components themselves, without external direction. Self-assembly of miniature triblock molecules may be used to produce texture on scales from the micron (one millionth of a meter) to the nanoscale (five to ten billionths of a meter) level. Certain types of oligomeric (short polymer) triblock molecules may self-assemble into mushroom-shaped nanostructures with a surface chemistry that may be tailored to produce opposite-end surfaces with varying levels of hydrophobicity. Blending these nanostructures with a bulk polymer may develop microscale-level surface texture with varying feature sizes, depending on the concentration of solution applied to the surface.

Assembling such structures molecule by molecule would be extremely time-consuming and impractical, given that each molecule may be only a few billionths of a meter in size. In contrast, because the proposed system of natural self-assembly may occur nearly instantaneously, it may allow the efficient use of many more molecules and may thus take place on a large scale—for example, on the entire windshield of a car. It may also be performed on a bench-top without the need for specialized equipment, making the process further advantageous for large-scale production.

Figure 1:
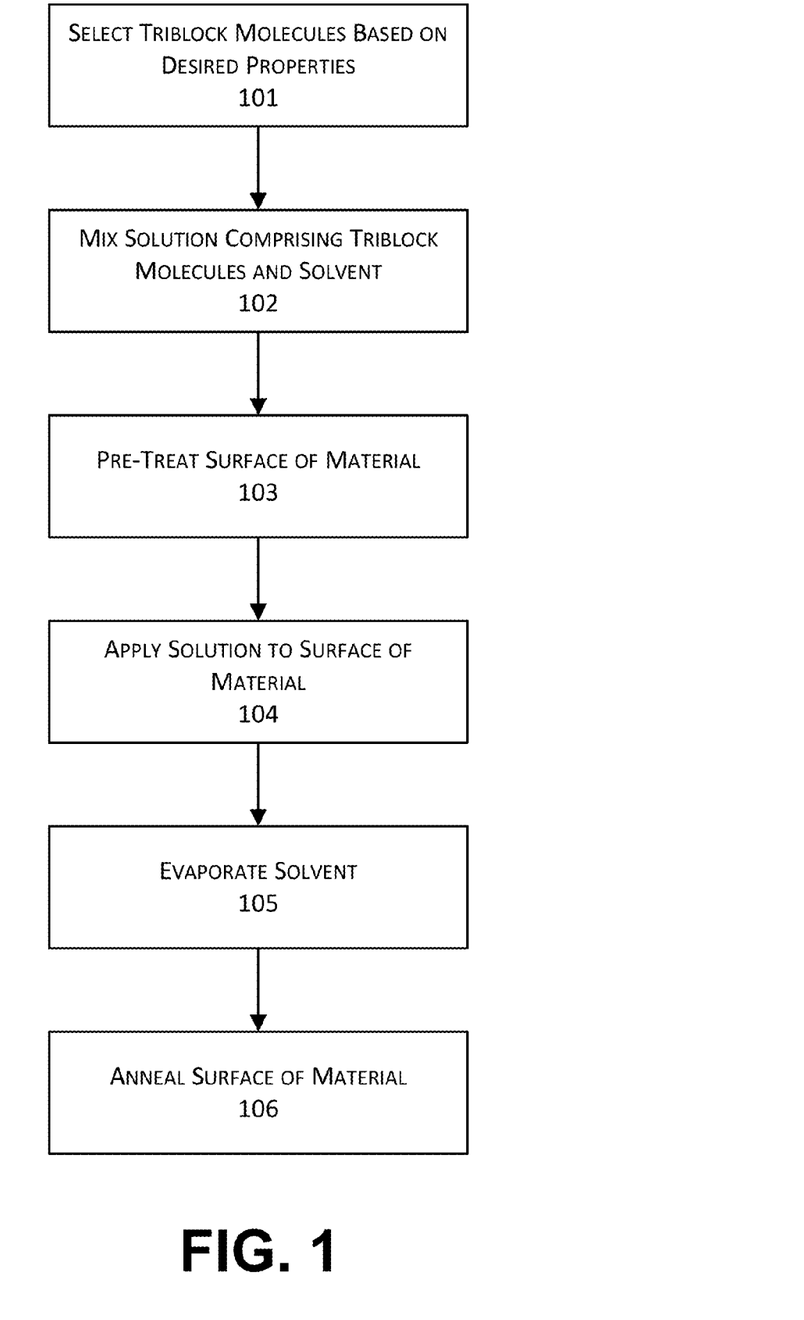
FIG. 1 is a flow diagram illustrating an example method for coating a surface of a material to achieve a desired degree of hydrophobicity.

FIG. 1 is a flow diagram illustrating an example method for coating a surface of a material to achieve a desired degree of hydrophobicity in accordance with the present disclosure, comprising operations 101-106 for performing functional operations. The illustrated operations 101-106 are arranged to provide functional operations including "Select Triblock Molecules Based On Desired Properties" at operation 101, "Mix Solution Comprising Triblock Molecules and Solvent" at operation 102, "Pre-Treat Surface of Material" at operation 103, "Apply Solution to Surface of Material" at operation 104, "Evaporate Solvent" at operation 105, and "Anneal Surface of Material" at operation 106.

In FIG. 1, operations 101-106 are illustrated as being performed sequentially, with operation 101 first and operation 106 last. It will be appreciated however that these operations may be re-ordered as convenient to suit particular embodiments, and that these operations or portions thereof may be performed concurrently in some embodiments.

In a "Select Triblock Molecules Based On Desired Properties" operation 101, each of the components of desired triblock molecules may be separately selected based on the desired properties for a coated surface. The components of self-assembling triblock molecules may be selected to comprise three parts, as described below with reference to FIG. 3. In general, triblock molecules may comprise an end group or tail portion, a flexible spacer portion, and a random coil portion. The three parts of the molecule will cause molecules to self-assemble into multi-molecule structures when subject to appropriate environmental conditions, as a result of competition between attractive forces in the end group and repulsive forces in the random coil, causing the molecules to form into mushroom shaped structures. The selection of each of the components of the molecule may include selecting particular properties depending on the desired properties of final assembled multi-molecule nanostructures coating a surface. The resulting nanostructures may be blended with bulk polymers or other materials to further develop surface texture on the coated surface.

The first portion of the molecule (the "end group"), forming the stem of the mushroom shape, may in some embodiments be selected to comprise a "rigid rod" portion and a "terminal group" portion. The rigid rod may comprise for example biphenyl ester segments or other aggregating phenol derivatives. The terminal group may comprise for example hydroxyl groups on an end of the rigid rod, in particular, on the end that bonds with a surface of the substrate to be coated. The terminal group generally may be selected to be hydrophilic, making it adhere strongly to other hydrophilic surfaces such as glass. The terminal group may comprise for example molecules such as OH and/or CF3. The more hydrophilic the terminal group, the more strongly the surface coating will bond with the material being coated. Thus, the terminal group portion of the molecule may be selected based on the desired bond strength between the coating (e.g., the molecule) and the coated material (e.g., the glass). In some embodiments, a weak bond may be desired; for example, if a surface coating is desired to be temporary, the terminal group portion may be selected to be less hydrophilic, so that the coating may be easily removed when desired through application of a solvent or other substance that will redissolve the triblock molecule structures.

In addition, in some embodiments the end group portion of the molecule may be selected based on desired bonding properties of the nanostructure itself. For example, a triblock molecule with a terminal group comprising hydroxyl groups will re-dissolve when placed in certain solvents. However, if smaller terminal groups, such as carbon trifluoride for example, are selected instead of hydroxyl groups, the molecules will pack more closely together, allowing them to crosslink through double bonds in the middle portion of the molecule and retain their shapes without redissolving as easily. Thus, properties of the end group portion of the molecule may be selected based on the desired effect of the nanostructures remaining intact even when exposed to solvents that would otherwise dissolve the structures, or in other embodiments on the desired effect of the nanostructures being easily dissolvable upon exposure to an appropriate solvent. Further, in some embodiments the end group portion of the molecule may be selected based on the particular surface to which the coating will be applied. For example, hydroxyl end groups adhere strongly to glass surfaces.

The middle portion of the molecule (the flexible spacer) may in some embodiments be selected to comprise a short chain of polyisoprene, a repeating hydrocarbon polymer with a double bond. The flexible spacer portion of the molecule may serve as a structural buffer that expands and condenses to accommodate the density of the end group segments. The double bond nature of the flexible spacer also may allow the use of a contrast agent, for example osmium tetroxide, to stain the coating a visible color and thus allow for visibility of a coating layer which is a desirable property for some materials.

The third portion of the molecule (the random coil), forming the cap of the mushroom shape, may in some embodiments be selected to comprise molecules including styrene, such as for example an oligomeric chain of polystyrene. The exposed random coil end of the structure generally may be selected to be hydrophobic, causing it to repel rain or other moisture. In some embodiments, the random coil portion may comprise dendrimers (repeatedly branched molecules with a highly symmetric structure), selected to impart particular surface properties, such as textured surfaces with very high hydrophobicity. Thus, the random coil portion of the molecule may be selected based on the desired surface texture and the desired amount of hydrophobicity. In other embodiments, the random coil portion may be selected to impart other properties as well; for example, in some embodiments it may be selected from biologically active materials to create a desired surface that would encourage cells to bind to it, or to encourage acceptance in a particular biological environment. For example, an artificial hip might be coated with a biologically active surface coating that has been selected to encourage acceptance of the implant by the host.

Figure 2A:
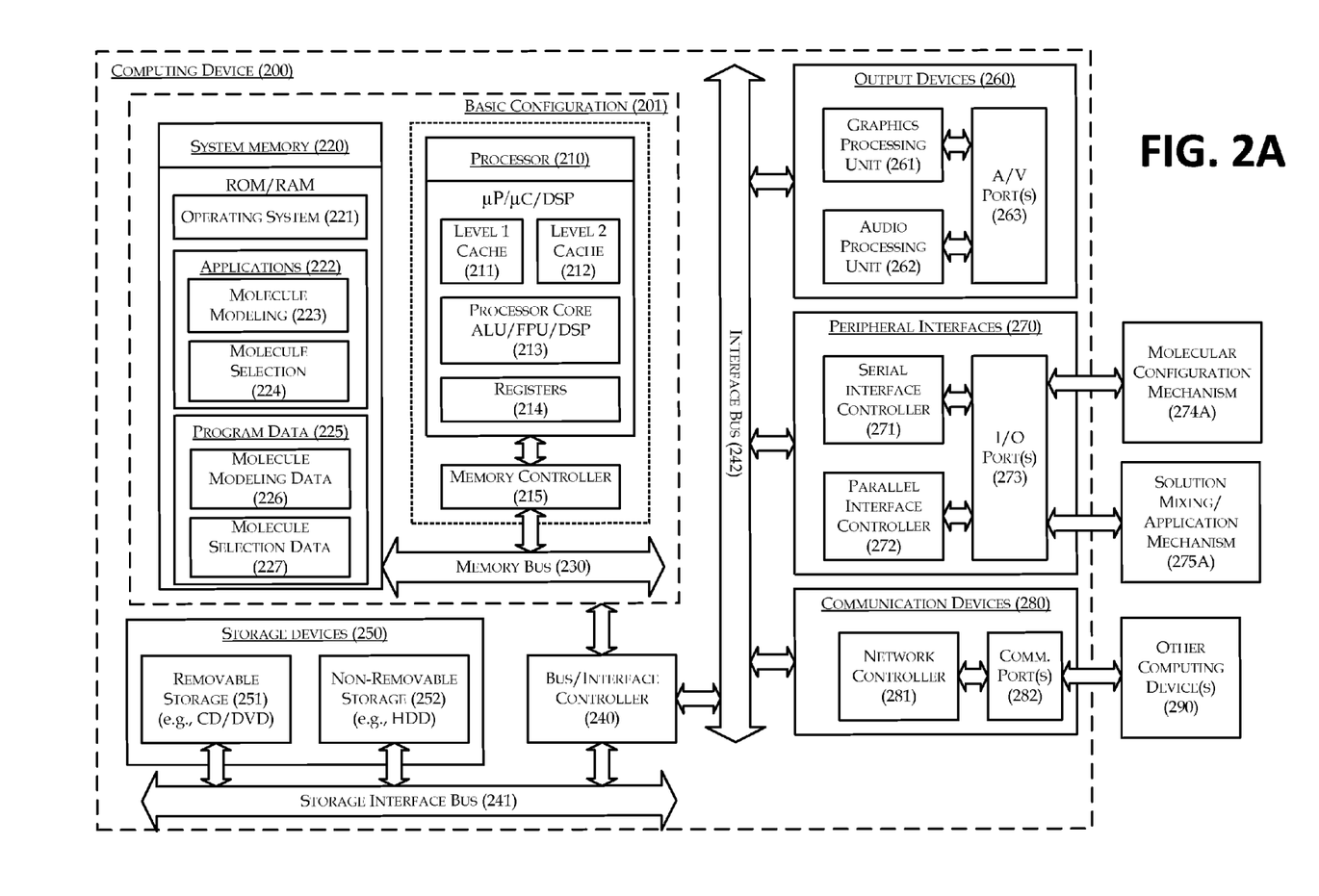
FIG. 2A is a block diagram illustrating a computing device as one example of a device that may control one or more of the operations needed to model and select desired molecules to form nanostructures that will bond to selected surface types.
Figure 2B:
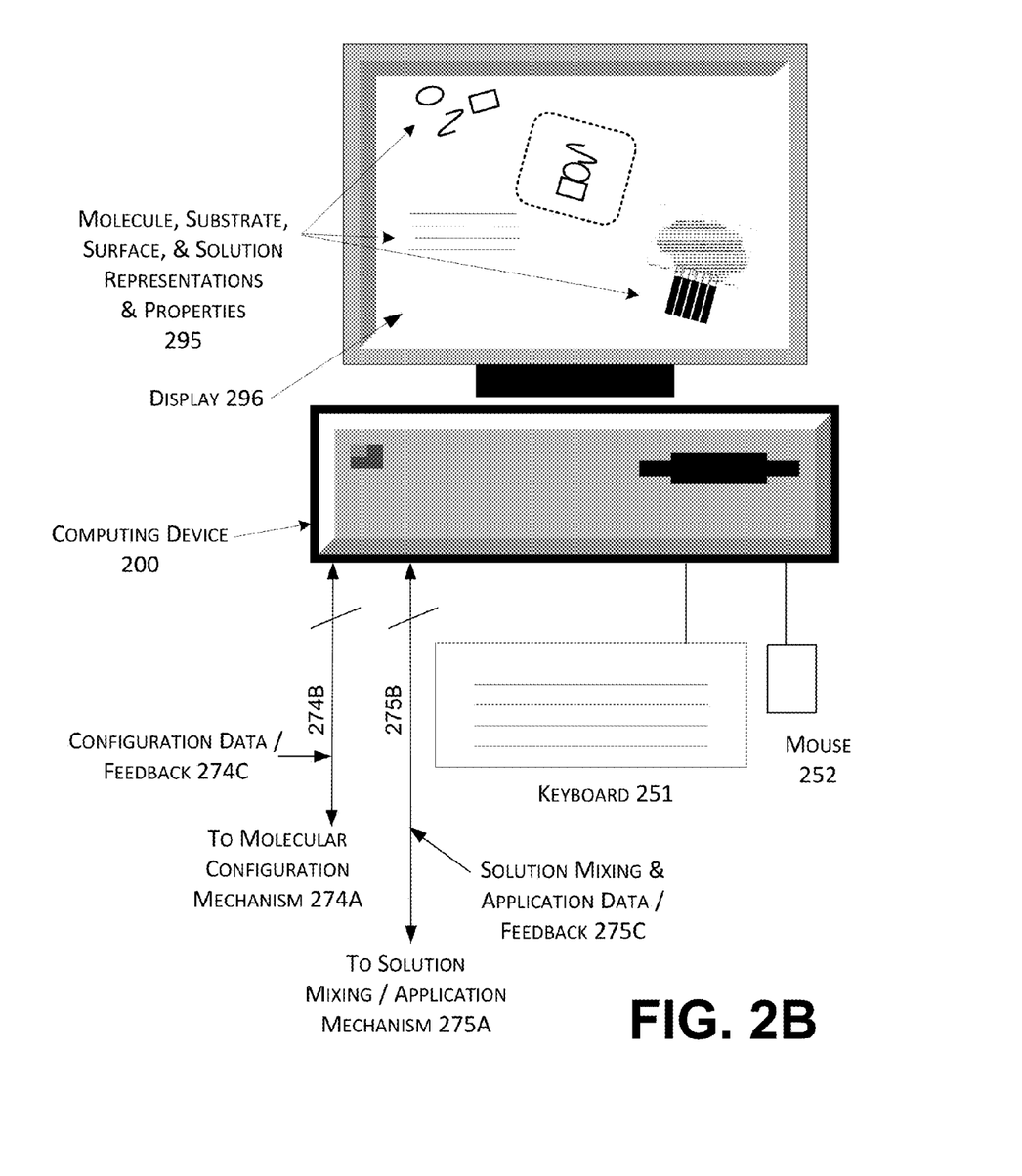
FIG. 2B is a diagram illustrating an example computing device configured to model molecule, substrate, surface, and solution properties.

In some embodiments, a computing device as illustrated in FIGS. 2A and 2B may be used to carry out one or more of the operations necessary to model and select the triblock molecule components. Appropriate software may implement a user interface on the computing device, allowing for software control and specification of the molecule modeling and selection process. In other embodiments, the triblock molecule components may be selected manually, based on the desired characteristics of the assembled molecules and the properties of the surface to be coated.

Figure 6:
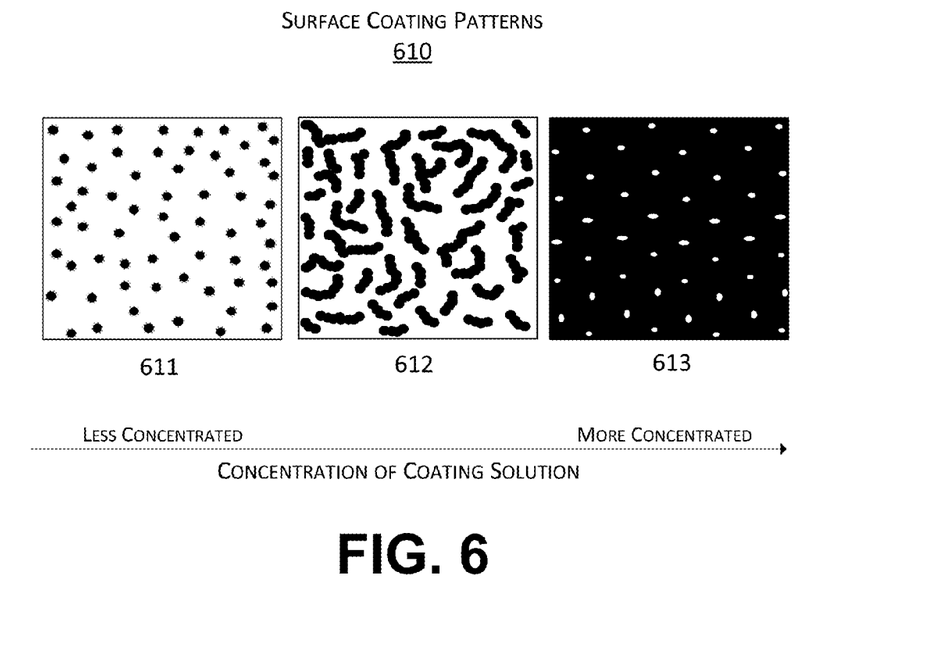
FIG. 6 is a diagram illustrating the change in surface coating patterns as the concentration of coating solution is increased.

In a "Mix Solution Comprising Triblock Molecules and Solvent" operation 102, triblock molecules exhibiting desired properties selected in operation 101 may be mixed into a solvent in a desired concentration. The solvent may comprise, for example, ethyl acetate, chloroform, or tetrahydrofuran. As the concentration of the molecules in the solution is increased, the surface texture of the resulting coating will change in pattern and the coated surface will be increasingly hydrophobic. As FIG. 6 illustrates, a lesser concentration of molecules in solvent will result in a surface texture with small features, causing the surface to be less hydrophobic, while a greater concentration of molecules in solvent will result in a surface texture with larger features, causing the surface to be more hydrophobic.

In a "Pre-Treat Surface of Material" operation 103, in some embodiments the surface may be pre-treated to produce different areas of the surface that are more and less hydrophilic. The more hydrophilic areas will bond with the surface coating, resulting in more hydrophobic areas of the surface due to the hydrophobicity of the exposed random coils in the surface coating, while the less hydrophilic areas will resist the surface coating, resulting in less hydrophobic areas of the surface.

One method of pre-treating the surface may be microcontact printing, a method of depositing molecules or nanoscale objects on surfaces via a patterned silicon stamp that has been coated with a solution of molecules, which are transferred to the surface upon contact. Microcontact printing allows patterns to be made on many different materials and on flat or curved surfaces, and may be used to achieve multiple levels of texture on a given surface. Microcontact printing also scales easily, allowing it to be used to pattern large surface areas. Repeated printing with different stamps may result in complex surface patterns comprising more than one kind of molecule. These techniques, which allow surface texture to be created through rapid self-assembly regardless of the size of the desired patterned area, provide advantages over lithographic or focused ion beam nano- and microsculpting techniques, which are more time-consuming and require more complex equipment.

In an "Apply Solution to Surface of Material" operation 104, the mixed solution may be applied to the surface of a material, in various embodiments, by dipping the material to be coated in the solution, spraying the material with the solution, pouring the solution over the surface of the material, or using any other application method as appropriate for the particular material and application requirements. The material may be dipped, sprayed, or poured a single time or multiple times, waiting a period of time between applications, which may form a single layer or multiple layers of nanostructures, depending on the properties of the material substrate and the solution. In some embodiments, a film containing the assembled nanostructures may be placed directly on a glass coating to achieve a highly hydrophobic surface, with additional methods used, such as the selection of dendrimers for example, to enhance the surface texture.

With regard to nanostructure layering, nanostructures can stack upon one another. In some embodiments, this can be achieved by increasing concentration of the solution that is used for dip-coating, spraying, etc. Stacked nanostructures may be held together in some embodiments through one or more of the molecular dynamics that drive the self assembly, van der walls forces, and covalent bonds. To produce a covalent bond between stacked nanostructures, the chemistry of the random coil portion of the triblock molecules may be adjusted to support bonding between the random coil and the terminal groups of the next layer.

In some embodiments, a computing device as illustrated in FIGS. 2A and 2B may be used to carry out one or more of the operations necessary to mix the triblock molecule components with solvent, pre-treat the surface, and/or apply the solution to the material surface. Appropriate software may implement a user interface on the computing device, allowing for software control and specification of the mixing, pre-treating, and solution application processes. In other embodiments, mixing the molecules with solvent, pre-treating the surface, and/or applying the solution to the surface may be performed manually.

In an "Evaporate Solvent" operation 105, the solvent may be evaporated, for example through the application of heat and appropriate ventilation, causing the triblock molecules to self-assemble into nanostructures coating the surface of the material, the nanostructures comprising a hydrophilic end bonding with the surface and an exposed hydrophobic end opposite the hydrophilic end.

In an "Anneal Surface of Material" operation 106, the surface of the material may in some embodiments be annealed by applying heat for a desired period of time. Specific annealing temperatures and annealing times will vary depending on a variety of factors such as the properties of the material substrate, the specific chemistry of the triblock molecules, and the desired properties of the resulting coating. In one example embodiment, annealing may be done at approximately 250° C. for 1-2 hours, causing the surface coating to become more permanent by creating a reaction in the isoprene segments that leads to a cross-linking of the triblock molecules. Once cross-linking occurs, the molecules may become thermoplastic, retaining their hardness when cooled. Annealing thus primarily serves to help affix the coating to the underlying surface.

FIG. 2A is a block diagram illustrating a computing device 200 as one example of a device that may control one or more of the operations needed to model 223 and/or select 224 molecules, arranged in accordance with the present disclosure. In a very basic configuration 201, computing device 200 typically includes one or more processors 210 and system memory 220. A memory bus 230 may be used for communicating between the processor 210 and the system memory 220.

Depending on the desired configuration, processor 210 may be of any type including but not limited to a microprocessor (µP), a microcontroller (µC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225-226.

As discussed above, applications 223-224 may include, for example, modeling the properties of various molecules, including molecule properties resulting from selection of various differing molecule parts, the ways the molecules interact with each other to form nanostructures, the ways nanostructure formation may vary in different concentrations, and the ways various nanostructures will bond to different surface types; and selecting appropriate molecules based on the desired properties. Program data 225-226 may include the modeling and selection data that is used by applications 223-224; for example, properties of the optimal molecules for achieving nanostructures that will bond strongly to a glass surface.

In some embodiments, the modeling process may involve the user selecting from a variety of molecule parts, solvents, and/or surface materials. The application may be configured in a variety of ways to allow the user to select desired elements through interaction with a user interface. For example, the application may display a list of elements to select from and may further display descriptive information for each selected part when the user selects it. For selecting the components of the triblock molecule, the application may identify molecular components that are commonly combined or whose properties may make them well-suited to be combined. Once the user selects a combination of molecule components, the application may generate a view of what the selected molecule will look like, and/or a detailed description of the triblock molecule properties. The view and description may include, for example, information about the size of the assembled molecule, the strength of the bonds within the molecule, or the degree of hydrophobicity and hydrophilicity that the ends of the molecule will possess. The application may also enable the user to select from a list of available solvents based on detailed information about the solvent, including how the solvent may interact with a modeled triblock molecule, and may provide detailed information about the modeled combination of molecules and solvent. Further, the application may enable the user to select from a list of available surface materials, and may provide detailed information about the types of molecules that may bind well to the selected surface and/or the concentration of molecule/solvent solution that may be required to achieve a desired surface coating.

Alternatively, the application may allow the user to begin by selecting the desired properties of a surface coating, and the application may then generate suggestions and detailed information about the molecule/solvent combinations that could self-assemble to produce the selected coating.

In various embodiments, once the user has selected the desired combination of elements, the application may generate a detailed graphic representation and/or a detailed written specification of the elements to be combined and the surface texture that would result from the selected combination. The user could then change one or more selected properties, causing the application to re-generate the graphic representation and written specification. The modeled properties may include, for example, the size of the desired triblock molecules, the strength of the bonds between the three components of the molecule, the degree of hydrophilicity and hydrophobicity of the opposite ends of the triblock molecule, the properties of the surface to be coated, the required concentration of molecules in solvent to achieve a desired surface texture, the required number of coating applications to achieve a desired surface texture, the amount of annealing required to achieve a desired surface texture, the strength of the bond between the surface coating and the underlying surface, the ability of the molecules to redissolve when exposed to a particular solvent, the desired color or other appearance of the coated material surface, or the biologically active nature of the surface coating.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273.

For example, in this embodiment, a molecular configuration mechanism 274A may be connected via an I/O port and used to transmit and receive configuration data in order to control the selection of the triblock molecule components. In this embodiment, the previously modeled molecule components may be selected for actual configuration, and an appropriate mechanism connected to the computing device may be engaged to combine the three selected components so that they will self-assemble into the desired triblock molecules. In addition, a solution mixing/application mechanism 275A may be connected via an I/O port and used to transmit solution mixing and application data relating to mixing the molecules with a solution in a desired concentration, and controlling the spraying, dipping, pouring, or other method of applying the solution to the material. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

The communications connection is one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. Computing device 200 may also be implemented as a personal computer including both laptop computer and non-laptop computer configurations.

FIG. 2B is a diagram illustrating an example computing device configured to model molecule, substrate, surface, and solution properties, arranged in accordance with the present disclosure. FIG. 2B comprises a computing device 200 such as computing device 200 depicted in FIG. 2A, connected to a display 296, a keyboard 251, and a mouse 252. The display may depict molecule, substrate, surface, and solution representations and properties 295.

Computing device 200 may optionally be coupled to a molecular configuration mechanism 274A via an I/O connection 274B through which configuration data and feedback 274C may be transmitted. Computing device 200 also may be coupled to a solution mixing/application mechanism 275A via an I/O connection 275B through which solution mixing and application data and feedback 275C may be transmitted.

In FIG. 2B, the display 296 depicts the various molecule, substrate, surface and solution representations and properties 295. For example, a resulting triblock molecule that would be formed from a variety of selected molecule components may be represented, as well as the self-assembled mushroom-shaped nanostructure that would result from the modeled conditions. In some embodiments, instructions that present a user interface on the display 295 may allow entry of desired molecule and/or coating properties, and may select and model molecule components, interactions of molecules and/or coating properties based on the user selections. Once a final decision has been made as to the particular components required to achieve the desired coating properties, the information may be transmitted to a molecular configuration mechanism 274A to carry out the actual selection and assembly of the specified triblock molecules. In some embodiments, a molecule specification may be provided allowing ordering of customized molecules from a third party supplier. The configuration data 274C transmitted may include data about the chemical makeup of each component (for example, biphenyl ester), the conditions needed to optimally join the three components, or the desired size of each component.

Computing device 200 may also transmit information to a solution mixing/application mechanism 275A to mechanically combine the configured molecules with an appropriate solvent to reach a desired concentration based on the amount of hydrophobicity desired in the coating, and to apply the mixture to a surface via dipping, spraying, coating, or other means in order to achieve a desired surface texture. In some embodiments, a solution specification may be produced indicating solution properties and or mixing procedures, for use in manually mixing a solution or mixing a solution using other equipment. The solution mixing and application data 275C transmitted may include data about the required concentration of molecules in the solution to achieve the desired surface texture and degree of hydrophobicity, the appropriate solvent to use given the characteristics of the selected triblock molecule, the properties of the surface to be coated, or the method of coating to be used. In other embodiments, the molecular configuration and/or the solution mixing and application may be performed manually.

Figure 3:
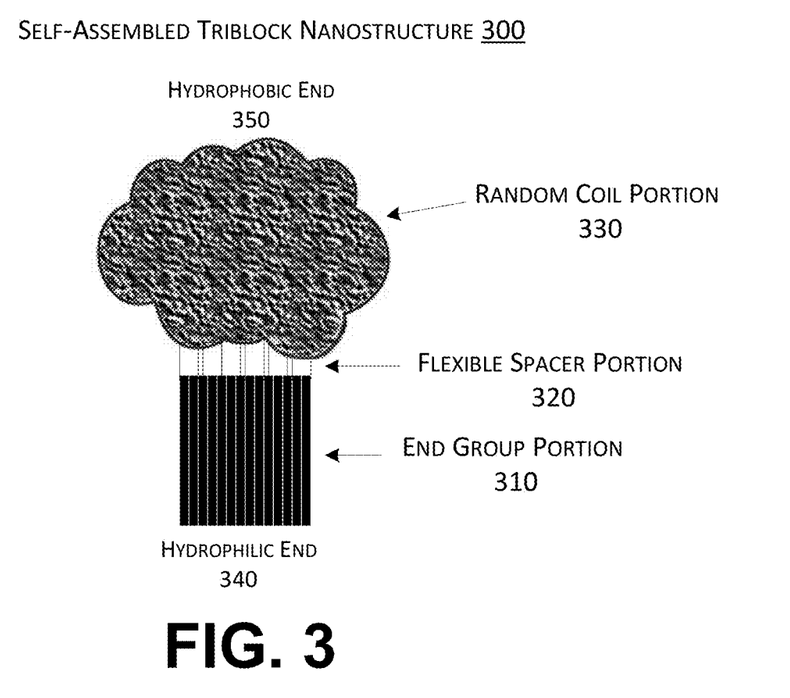
FIG. 3 is a diagram illustrating an example self-assembled triblock nanostructure.

FIG. 3 is a diagram illustrating an example self-assembled triblock nanostructure 300 comprising an end group portion 310, a flexible spacer portion 320, and a random coil portion 330, in accordance with the present disclosure. The nanostructure 300 also comprises a hydrophilic end 340 at the bottom of the end group portion 310 and a hydrophobic end 350 at the top of the random coil portion 330.

As discussed in FIG. 1, each of the three portions of the triblock nanostructure 300 may be separately selected based on the desired properties of the resulting nanostructure, resulting in the ability to create structures with a range of hydrophobic or self-cleaning properties, as well as a range of permanence or impermanence in the applied surface coating.

The end group portion 310, particularly the composition of the terminal groups at the ends of the rods, determines the ultimate hydrophilicity of the structure. The more hydrophilic the nanostructure is, the more readily and strongly it will bond to a hydrophilic surface, such as glass. Thus, a strongly hydrophilic end group portion 310 may be selected when a more durable surface coating is desired, while a weakly hydrophilic end group portion 310 may be selected when a less permanent surface coating is desired. In embodiments where a less hydrophilic coating is desired, a solvent or other material may be applied to the coated surface when desired to easily remove the coating. As discussed previously, the end group portion 310 also may be selected based on other factors, for example, on the desired permanence of the nanostructure itself or on the properties of the particular surface to which the coating will be applied.

The flexible spacer portion 320 may be selected to expand or condense based on the density of the end group segments. The flexible spacer 320 also may be selected in conjunction with a contrast agent, such as osmium tetroxide, for example, to stain the coating a visible color and thus allow for visibility of a coating layer which is a desirable property for some materials.

The random coil portion 330 determines the ultimate hydrophobicity of the structure. The more hydrophobic the nanostructure is, the more it will exhibit self-cleaning properties. A strongly hydrophobic random coil portion 330 may be created through selecting particular molecules, such as dendrimers, for example, that may create highly textured hydrophobic surfaces. As discussed previously, in addition to desired surface texture and the desired amount of hydrophobicity, the random coil portion 330 also may be selected from biologically active materials to create a desired biologically active surface (for example, on an artificial hip) that would encourage cells to bind to it and/or reduce the risk of infection or rejection.

Figure 4:
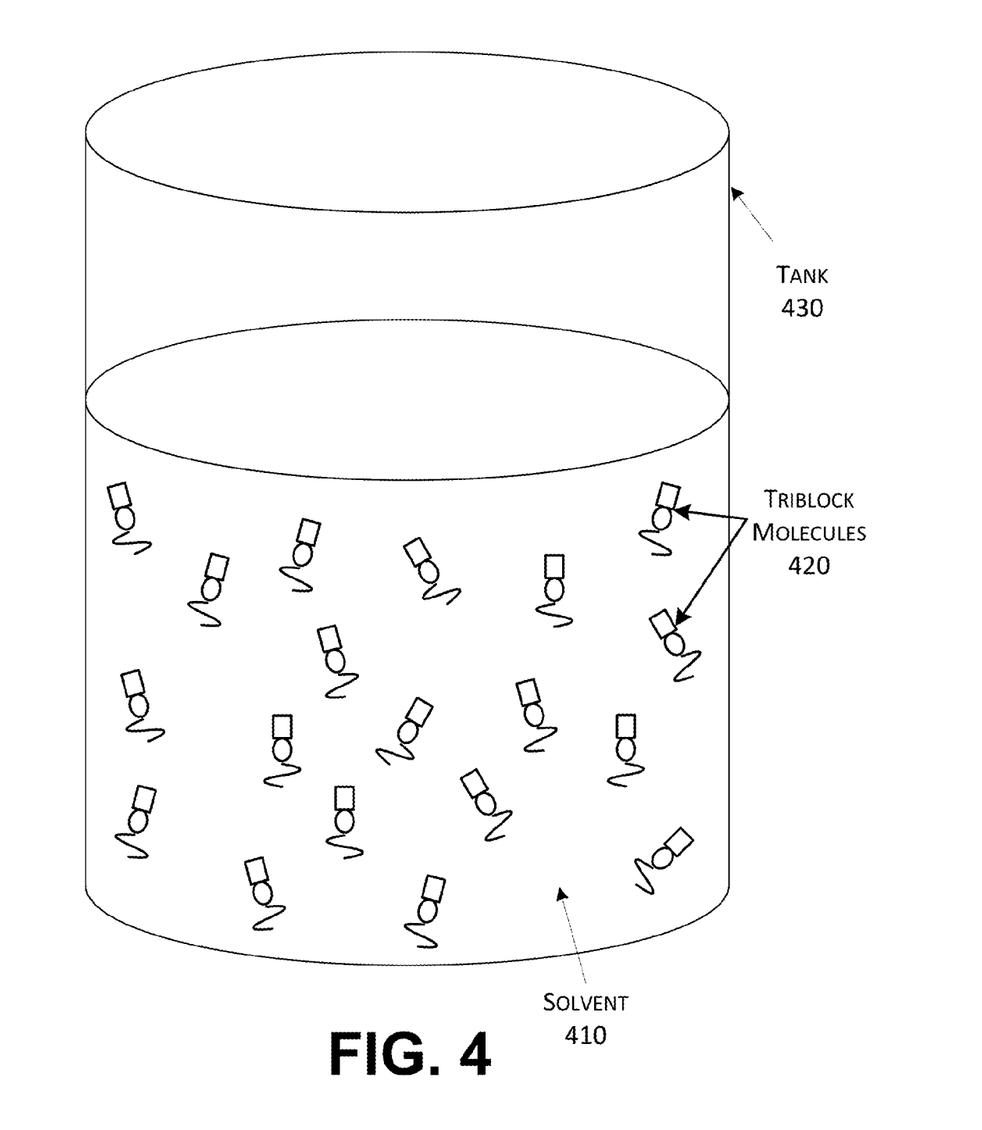
FIG. 4 is a diagram illustrating an example tank containing a concentration of self-assembled triblock nanostructures in a solvent.

FIG. 4 is a diagram illustrating an example tank containing a concentration of self-assembled triblock nanostructures in a solvent, in accordance with the present disclosure. FIG. 4 comprises a tank 430 containing a solvent 410 mixed with a plurality of triblock molecules 420.

The solvent 410 may comprise, for example, ethyl acetate, chloroform, or tetrahydrofuran. The triblock molecules 420 may comprise molecules of one type or of a variety of desired molecule types, and each molecule type may include any combination of end groups, flexible spacers, and random coils selected based on one or more of the properties of the molecular components, the desired amount of hydrophilicity and hydrophobicity at the opposite ends of the molecule, the properties of the surface to be coated, the desired properties of the surface coating to be applied, the desired bond strength between the surface coating and the material being coated, the desired visibility of the surface coating, the desired biologically active property of the surface coating, and/or the desired method of coating the surface. The triblock molecules 420 may be made through manual or mechanical means, or ordered from a triblock molecule supplier. Alternatively, custom triblock molecules may be designed and made with the specific desired properties using known triblock manufacture techniques. In some embodiments, a computing device, such as the device depicted in FIG. 2, may be used to model and select appropriate molecular components based on the variety of properties discussed above, controlling a molecular configuration mechanism such as 274A or producing a molecule specification for ordering appropriately configured triblock molecules. A computing device may also be used to direct the mixing of the solution shown in FIG. 4 and the application of the solution to a surface.

Figure 5A:
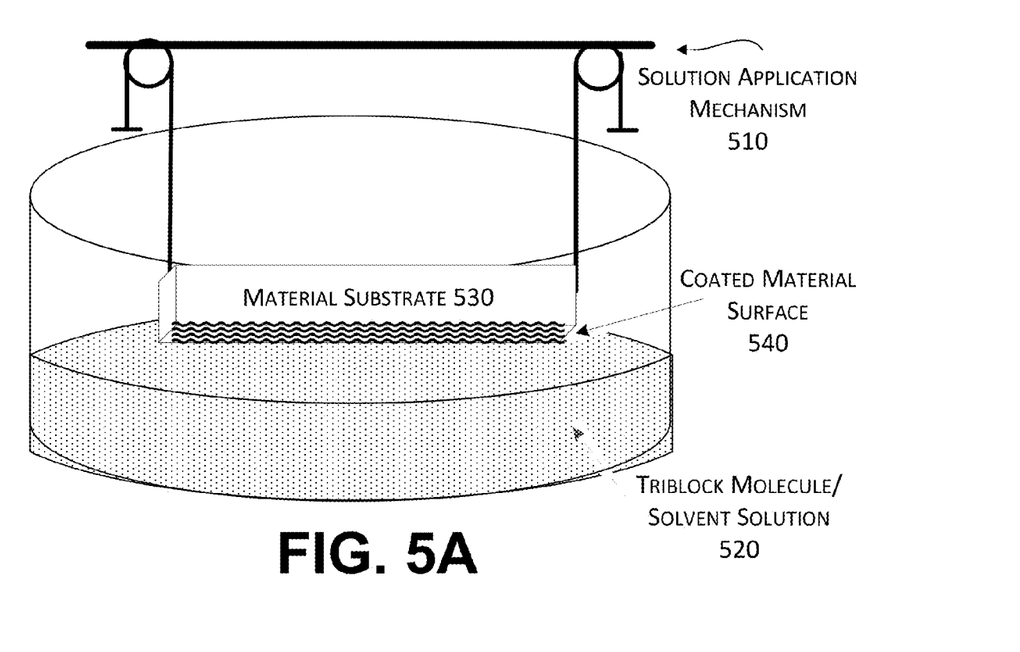
FIG. 5A is a diagram illustrating an example application of the triblock molecule/solvent solution to a material substrate through dip-coating.
Figure 5B:
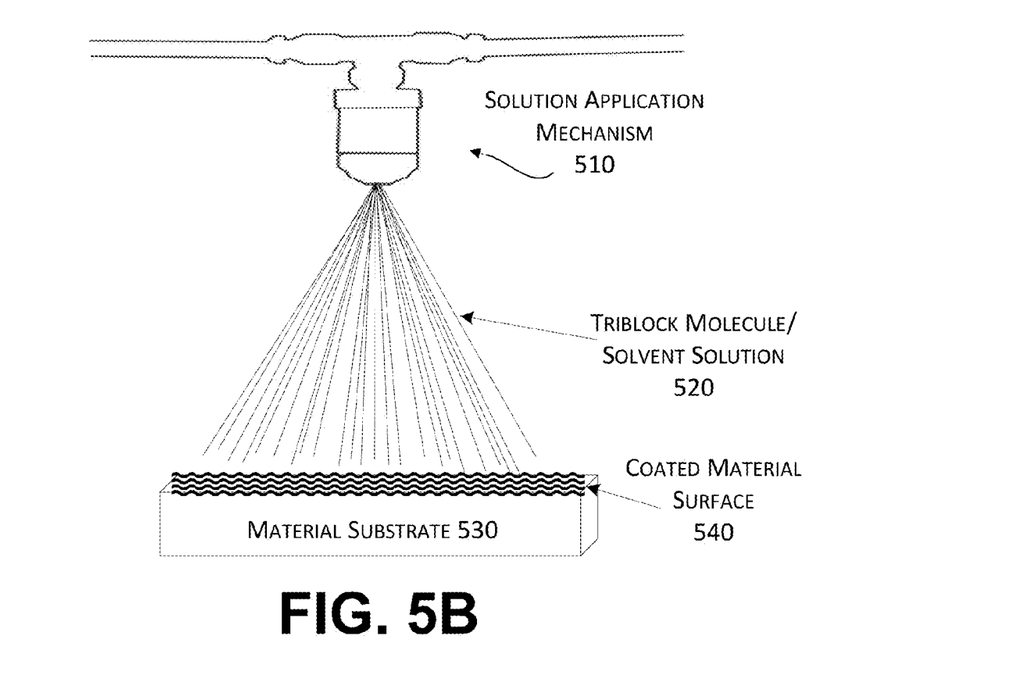
FIG. 5B is a diagram illustrating an example application of the triblock molecule/solvent solution to a material substrate through spraying.

FIGS. 5A and 5B are diagrams illustrating example applications of the triblock molecule/solvent solution to a material substrate through dip-coating, in accordance with the present disclosure. FIGS. 5A and 5B may comprise a solution application mechanism 510, a triblock molecule/solvent solution 520, a material substrate 530, and a coated material surface 540.

In FIG. 5A, the material substrate 530 may be dip coated to create a coated material surface 540 by using a dipping mechanism, for example the depicted solution application mechanism 510, to submerge a surface of the material substrate 530 into a tank or other container filled with a triblock molecule/solvent solution 520. In FIG. 5B the material substrate 530 may be spray-coated with the triblock molecule/solvent solution 520 to create a coated material surface 540.

The material substrate 530 may comprise one or more of a variety of materials with a range of hydrophilic properties, and may have been pre-treated to create areas of differing hydrophilicity and hydrophobicity that may affect the pattern and hydrophobicity of the coated material surface 540. The triblock molecule/solvent solution 520 may be more or less concentrated, depending on the desired texture of the coated material surface 540, with a more concentrated solution resulting in a surface texture with larger features and resulting greater hydrophobicity. Similarly, dipping or spraying the material substrate 530 multiple times may result in greater hydrophobicity of the coated material surface 540, depending on the specific molecules involved. In various embodiments, the molecules in the triblock molecule/solvent solution 520 may have been selected, for example, to achieve a particular color in the coated material surface 540, to create a biologically active surface coating, or to create a stronger or weaker bond between the surface coating 540 and the material substrate 530.

FIG. 6 is a diagram illustrating a microscopic view of example changes in surface coating patterns as the concentration of coating solution is increased, in accordance with the present disclosure. FIG. 6 comprises three surface coating patterns 610, ranging from small, isolated surface texture features 611 formed from one or more isolated nanostructures and corresponding to a less concentrated solution, resulting in a less hydrophobic surface texture, to medium surface texture features 612 formed from touching and clustered nanostructures and corresponding to medium solution concentrations, to large surface texture features 613 formed from closely packed nanostructures and corresponding to a more concentrated solution, resulting in a more hydrophobic surface texture. In some embodiments, different surface coating patterns may also be achieved through multiple applications of the coating solution.

Figure 7A:
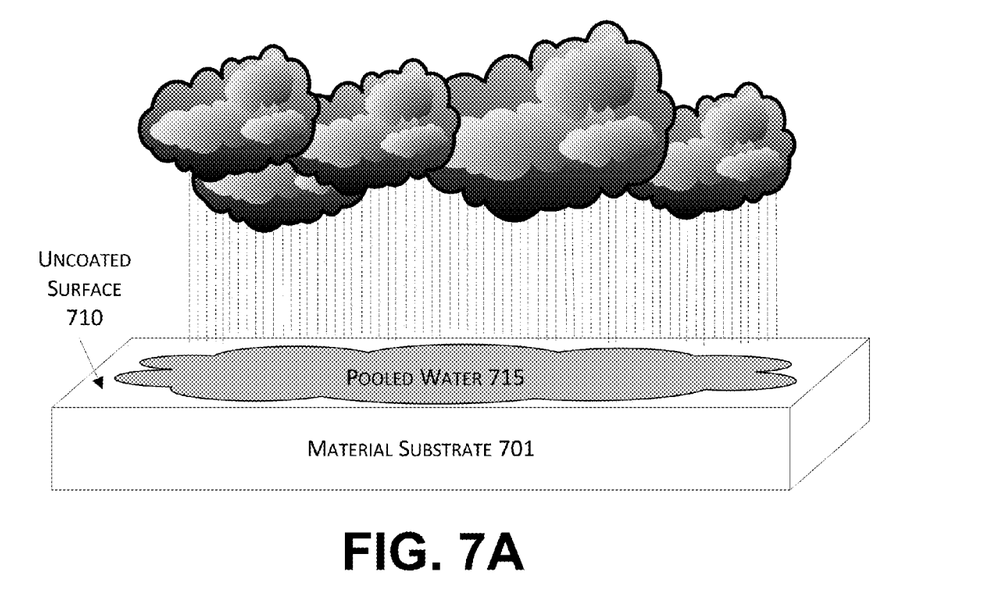
FIG. 7A is a diagram illustrating the spreading effect of rainwater on an uncoated substrate.

FIG. 7A is a diagram illustrating the spreading effect of rainwater on an uncoated substrate, in accordance with the present disclosure. FIG. 7A depicts a material substrate 701 with an uncoated surface 710 that is exposed to rain or other moisture, resulting in pooled water 715 collecting and remaining on the uncoated surface.

Figure 7B:
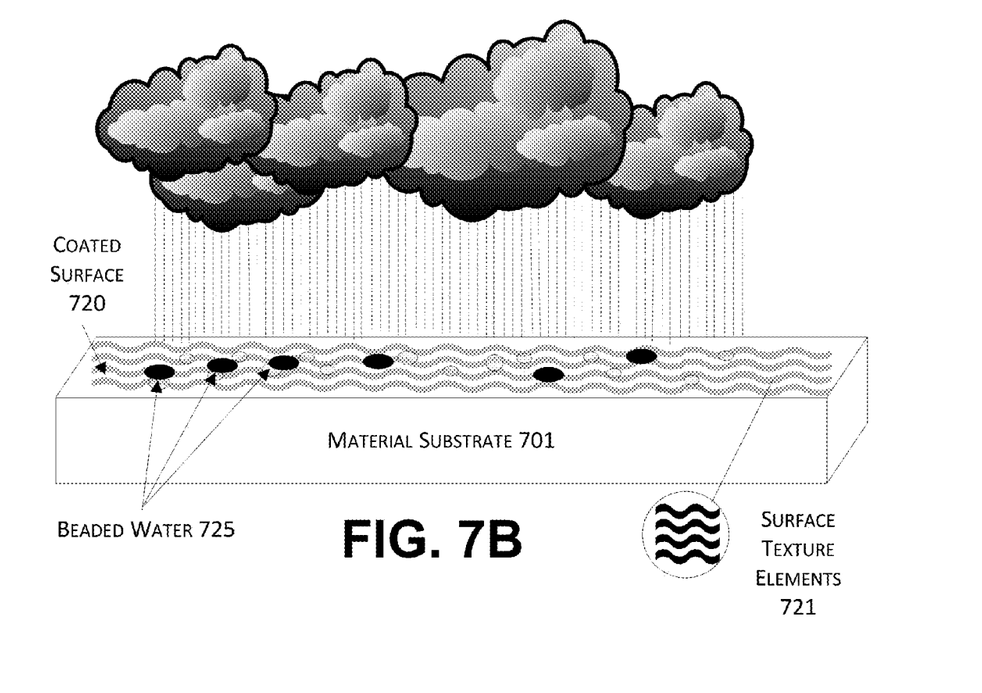
FIG. 7B is a diagram illustrating the beading effect of rainwater on a coated substrate, all arranged in accordance with the present disclosure.

FIG. 7B is a diagram illustrating the beading effect of rainwater on a coated substrate, in accordance with the present disclosure. FIG. 7B depicts a material substrate 701 with a coated surface 720 that is exposed to rain or other moisture. The coated surface contains surface texture elements 721 which are produced by the self-assembled nanostructures discussed herein, and which give the surface a hydrophobic property, causing water to bead 725 on the surface and easily run off, rather than pooling. As discussed previously, the coated surface 720 may be created through processes such as dip coating, spraying, pouring, or similar processes, or through microcontact printing or similar means. The coated surface 720 may be of arbitrary shape, with curved or angular features. The surface texture elements 721 may vary in size depending on the concentration of molecules in the coating solution or the number of times the surface 720 is coated with the solution, with larger surface texture elements 721 creating a more hydrophobic surface.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which certain aspects of processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount for a computing device, the implementer may opt for a mainly hardware and/or firmware vehicle. If flexibility is paramount, the implementer may opt for a mainly software implementation. The implementer may also opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations that may utilize a computing device, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the computer-implementable mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A solution tailored for coating material surfaces, comprising:
   a solvent;
   triblock molecules mixed in the solvent, each triblock molecule comprising:
      an end group portion comprising:
         a rigid rod portion comprising an aggregating phenol derivative; and
         a terminal group portion comprising a hydroxyl group or carbon trifluoride;
      a flexible spacer portion comprising a repeating hydrocarbon polymer with a double bond;
      a random coil portion comprising molecules including styrene, wherein the random coil portion comprises dendrimers;
      a hydrophilic end disposed proximal to the end group portion;
      a hydrophobic end opposite the hydrophilic end, wherein hydrophobicity of the hydrophobic end is tailored to a desired hydrophobicity of a surface coating formed from nanostructures produced by self-assembly of the triblock molecules during evaporation of the solvent; and
   a bulk polymer blended with the triblock molecules to develop surface texture of the surface coating.

2. The solution of claim 1, wherein the rigid rod portion aggregating phenol derivative comprises a biphenyl ester segment.

3. The solution of claim 1, wherein the terminal group portion comprises the hydroxyl group.

4. The solution of claim 1, wherein the terminal group portion comprises the carbon trifluoride.

5. The solution of claim 1, wherein molecules in the terminal group portion are adapted for desired bond strength between the hydrophilic end and the material surfaces.

6. The solution of claim 1, wherein the flexible spacer portion comprises a chain of polyisoprene.

7. The solution of claim 1, wherein molecules in the flexible spacer portion are adapted to expand and condense to accommodate density of end group portions.

8. The solution of claim 1, wherein molecules in the flexible spacer portion are adapted to allow use of a contrast agent to stain the surface coating to allow for visibility of the surface coating.

9. The solution of claim 8, wherein the contrast agent comprises osmium tetroxide.

10. The solution of claim 1, wherein the random coil portion molecules including styrene comprise oligomeric chains of polystyrene.

11. The solution of claim 1, wherein the dendrimers are selected to impart desired surface texture the surface coating.

12. The solution of claim 1, wherein molecules in the random coil portion comprise a hydrophobic property adapted for the desired hydrophobicity of the hydrophobic end.

13. The solution of claim 1, wherein molecules in the random coil portion comprise a biologically active property.

14. The solution of claim 1, wherein the bulk polymer is adapted to develop nanoscale or microscale-level surface texture with varying feature sizes in the surface coating.

15. The solution of claim 1, wherein a concentration of the triblock molecules mixed in the solvent is adapted for a desired hydrophobicity of the surface coating.

16. The solution of claim 1, wherein the solvent comprises one or more of ethyl acetate, chloroform, and tetrahydrofuran.

* * * * *